3,320,212
α-SULFOCARBOXYLIC ESTERS OF OXY-
ALKYLATED POLYPHENOLS
Kwan-Ting Shen and Patrick M. Quinlan, St. Louis, Mo.,
assignors to Petrolite Corporation, Wilmington, Del.,
a corporation of Delaware
No Drawing. Filed May 3, 1962, Ser. No. 192,087
9 Claims. (Cl. 260—49)

This invention relates to esters of α-sulfocarboxylic acids and oxyalkylated polyphenols. More particularly this invention relates to esters of the formula

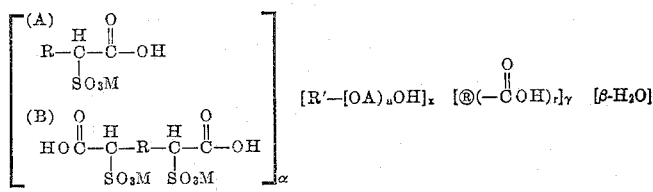

where R is hydrocarbon radical (alkyl, alkylene, etc.) such as (1) an alkyl group having at least 6 carbon atoms, for example 6–50 or more, advantageously at least 10 carbon atoms, but preferably 14–16 carbon atoms; or (2) an alkylene group having at least 1 carbon atoms, for example 1–50 or more, advantageously 2–35 but preferably 4–10; A is a lower alkylene group; $a$ is a number determined by the number of alkylene oxide units added, for example 1–100 or more, such as 1–50, advantageously 1–20, but preferably 1–10; $x$ is a number determined statistically by the number of oxyalkylatable phenolic groups, (for example $Q+2$ of the resin formula below); $\alpha$ is a number whose maximum value is determined by $x$ and whose minimum value is determined by the moles of sulfoacids one desires to esterify into the oxyalkylated polyphenol; M is hydrogen or a cation; R' is the polyphenol moiety; ® is the moiety of the carboxylic acid; $r$ is a number determining the number of carboxylic acid groups in the acid, for example 1–3 or more, but preferably 1; $\gamma$ is a number representing the number of moles of carboxylic acids in the molecule; and $\beta$ represents the number of moles of water removed in preparing the compound.

R' in the above formula is derived from a polyphenolic compound, i.e., a compound having more than one phenolic ring whose phenolic rings are either directly joined or joined through a radical bridge, for example a phenol-carbonyl type resin of the formula

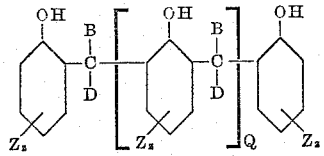

wherein Z is a hydrogen or a ring substituted group preferably hydrocarbon (i.e., alkyl, alkenyl, aryl, aralkyl, etc.) and most preferably alkyl, with maximum substitution being determined by the number of ring substitutable positions. It is generally substituted in the meta or para positions, but is preferably parasubstituted. Thus, $z=1$–3, but preferably 1. The unit

is derived from a carbonyl group, for example an aldehyde or a ketone, but preferably an aldehyde and most preferably formaldehyde. B and D, which may or may not be the same, are hydrogen or hydrocarbon groups such as alkyl, etc., and Q, a number indicating molecular units in the resin, may be 0 or higher, such as 0–100, for example 1–25, and advantageously 1–15, but preferably 1–10.

In addition the resin may contain one or more —CH₂—O—CH₂— groups in place of the

linkages. For example, a resin of the formula

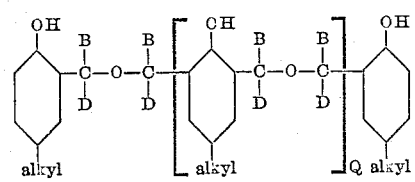

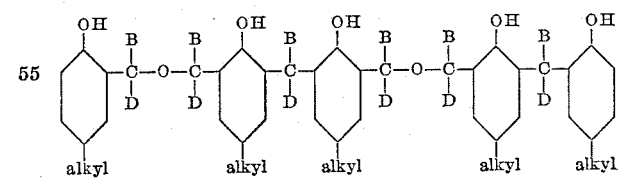

or other random arrangements thereof. Specific embodiments thereof include the following:

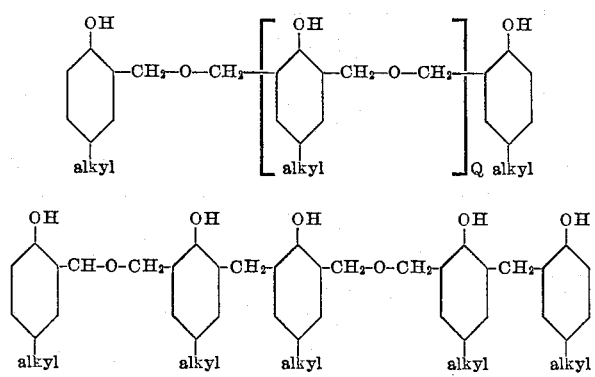

The following is an example of the preferred embodiment:

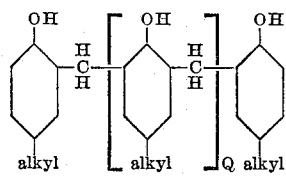

where Q is 1–25, advantageously 1–15, but preferably 1 to 10.

Although the phenol-carbonyl type resins are the preferred embodiment, the term "polyphenolic compound" also includes the following:

(1)–(5)

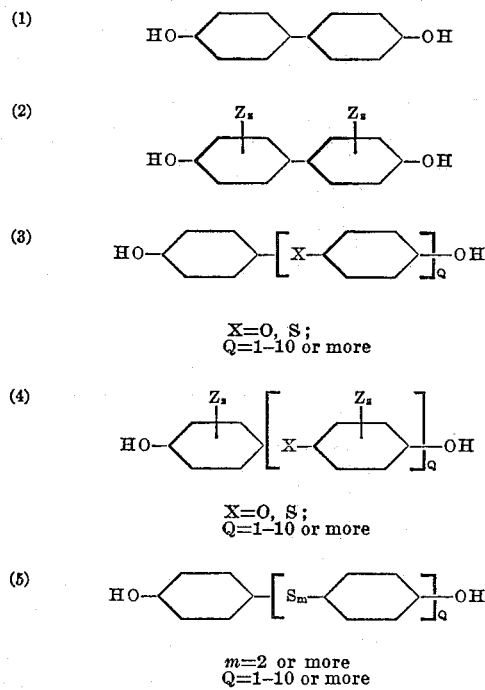

and $Z_z$ ring substituted derivatives thereof.

(6)

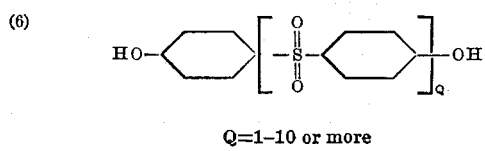

Q=1–10 or more and substituted derivatives thereof.

(7)

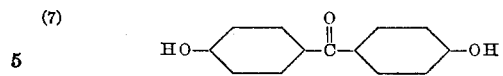

and substituted derivatives thereof.

(8)

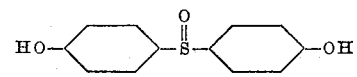

and substituted derivatives thereof.

(9)

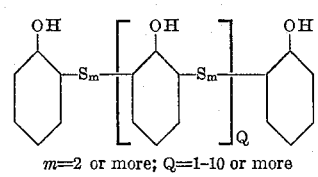

m=2 or more; Q=1–10 or more

(10) Phenolic nuclei joined to different carbon atoms (as contrasted to carbonyl derived resins wherein the phenolic nuclei are joined to the same carbon atoms), such as acetylene-phenolic resin, dichloroethylether-phenolic resin, dichlorohydrin-phenolic resins, etc.

(11) In addition, the phenolic group can also be terminally substituted with a non-functional or functional group for example, salicyclic ester, halo, alkyl, etc. is employed to yield a resin of the type

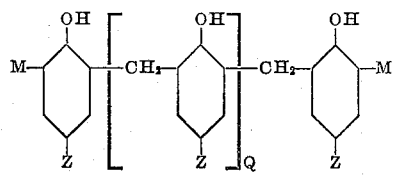

Thus, M may be alkyl, halo, $CH_2OH$, —$CH_2Cl$, an ester group, etc.

The parent resins, and oxyalkylated derivatives thereof, are well known. For example, they have been described in the following patents; 2,499,366, 2,499,367, 2,499,368, 2,499,370, 2,501,015 and elsewhere. These patents are, by reference, included in the present specification.

In Table I below are presented resins which are representative of those suitable for producing the compositions of this invention. This list is illustrative only, and is obviously not exclusive. In the table headings, Z represents the hydrocarbon substituent in the phenolic ring; ⊗ represents the bridging radical, derived from the respective aldehydes employed; and Q represents the number of phenolic units present in the resin, exclusive of the end units, and on a statistical basis. The molecular weights shown are calculated from Q and the molecular weights of the starting raw materials used in each case. In other words, the resins may broadly be represented as follows:

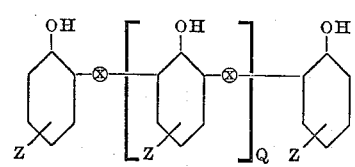

TABLE I

| Ex. | Z | Position of Z | ⊗ derived from | Q | Mol. Wt. of Resin Molecule (based on Q+2) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclohexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclohexyl | do | do | 1.5 | 646.0 |
| 30a | Hexyl | do | do | 1.5 | 653.0 |
| 31a | do | do | do | 1.5 | 688.0 |
| 32a | Octyl | do | Acetaldehyde | 1.5 | 786.0 |
| 33a | Nonyl | do | do | 1.5 | 835.0 |
| 34a | Octyl | do | Butyraldehyde | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde | 2.0 | 636.0 |
| 38a | Amyl | do | do | 2.0 | 692.0 |
| 39a | Hexyl | do | do | 2.0 | 748.0 |
| 40a | Cyclohexyl | do | do | 2.0 | 740.0 |

$(OA)_a$ is derived from any suitable $\alpha, \beta$ alkylene oxide, for example, alkylene oxides of the formula

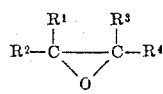

where $R^1$, $R^2$, $R^3$, $R^4$ are hydrogen or a substituted group, such as alkyl, cycloalkyl, aryl, etc., for example ethylene oxide, propylene oxide, butylene oxide, amylene oxide, octylene oxide, styrene oxide, methylstyrene oxide, cyclohexene oxide (where $R^1$ and $R^3$ are joined to form a ring), etc.

Equivalents of alkylene oxides can also be employed, for example alkylene carbonates, i.e. ethylene carbonate, propylene carbonate, butylene carbonate, etc. In addition alkylene oxides of the glycide, methyl glycide, etc. type and their equivalents can also be employed.

$(OA)_a$ denotes (1) homo units for example $-(OEt)_n$, $-(OPr)_n-$, $-(OBu)_n-$, $-(O\text{ Octyl})_n-$, $$-(O-CHCH_2)_n-$$

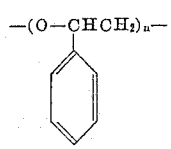

etc., (2) block units, $$-(OEt)_n(OPr)_m-, -(OEt)_n(OBu)_m-$$
$$(OPr)_n(OEt)_m(OPr)_x, (OEt)_n(OPr)_m(OBu)_x$$

$$(OEt)_n(OCH-CH_2)_m$$

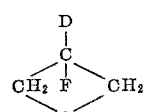

etc., where $n+m+x=a$; (3) hetero units containing group which are rando mixtures of more than one oxide $(OEt-OPr)_n$, $(OPr-OBu)_n$, $(OEt-OBu)_n$, wherein the ratio of each oxide to the other is for example 1-99 to 99-1; (4) hetero-homo units for example $$(EtO)_n(EtO-PrO)_m, (EtO)_n(PrO)_m(EtO-PrO)_x$$
$$(EtO-PrO)_n(BuO)_m$$

etc.

In addition, $(OA)_a$ can be derived from oxetanes (e.g. $\alpha-\gamma$ alkylene oxides), for example those of the formula $$\begin{array}{c} D \\ | \\ C \\ CH_2 \diagup \diagdown CH_2 \\ \diagdown O \diagup \end{array} \quad F$$

where D and F are hydrogen or a substituted radical for example alkyl, aryl, cycloalkyl, alkenyl, aralkyl, etc.

In addition, D and F can be substituted such as where the oxetane is derived from pentaerythritol and derivatives thereof. Examples of such oxetanes can be found in the American Chemical Society Monogram "The Pentaerythritols," by Berlow et al. (Reinhold 1958) chapter X.

Preferred embodiments of such pentaerythritol derived oxetanes include those of the formula

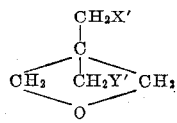

where X′ and Y′ are halogen, cyano, hydroxy, alkoxy, etc.

The R moiety which completes the carbon chain of the carboxylic acid from which the α-sulfo carboxylic acid is derived has the meaning described above. These acids may be of animal, vegetable or mineral origin.

The sulfacid may be a polycarboxylic acid, for example of the formula

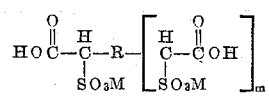

where $m$ is an integer for example, 1–3, but preferably 1, where the formula is

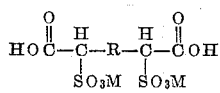

Esters of these acids and the oxyalkylated resin may be illustrated by the following formula

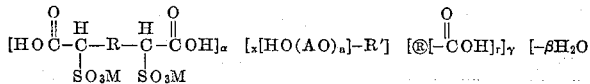

Typical examples of carboxylic acids capable of being converted to a-sulfo acids includes those derived from alkane carboxylic acids,

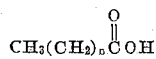

and alkylene dicarboxylic acids,

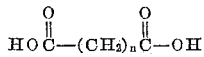

Since the poylphenols of this invention may be block polymers containing blocks or segments of alkylene oxide units which are added sequentially, the reaction is in essence a stepwise procedure. For the sake of simplicity of presentation, the invention will be illustrated by employing as a base oxyalkylatable compound R′(OH)$_x$ and by employing only ethylene, propylene, and butylene oxides with the understanding that other hydrophobe oxides can be used in place of propylene and butylene oxides such as amylene oxide, octylene oxide, styrene oxide, etc. These are shown in the following table.

TABLE II

*Step I*

(1) R′[(EtO)$_n$OH]$_x$
(2) R′[(PrO)$_n$OH]$_n$
(3) R′[(BuO)$_n$OH]$_x$
(4) R′[(MO)$_n$OH]$_x$
(5) R′[(PrO—BuO)$_n$OH]$_x$
(R′=polyphenol moiety)
(MO=mixed EtO—PrO)

*Step II*

Reaction of the Step I product with one of the five oxides or mixtures employed in Step I, which oxide had not been reacted in the immediately preceding step. For example:

(6) R′[(EtO)$_n$(PrO)$_m$OH]$_x$
(7) R′[(EtO)$_n$(BuO)$_m$OH]$_x$
(8) R′[(EtO)$_n$(MO)$_m$OH]$_x$
(9) R′[(EtO)$_n$(PrO—BuO)$_m$OH]$_x$
(10) R′[(PrO)$_n$(EtO)$_m$OH]$_x$
(11) R′[(PrO)$_n$(BuO)$_m$OH]$_x$
(12) R′[(PrO)$_n$(MO)$_m$OH]$_x$
(13) R′[(PrO)$_n$(ProO—BuO)$_m$OH]$_x$
(14) R′[(BuO)$_n$(EtO)$_m$OH]$_x$
(15) R′[(BuO)$_n$(PrO)$_m$OH]$_x$
(16) R′[(BuO)$_n$(MO)$_m$OH]$_x$
(17) R′[(BuO)$_n$(PrO—BuO)$_m$OH]$_x$
(18) R′[(MO)$_n$(EtO)$_m$OH]$_x$
(19) R′[(MO)$_n$(PrO)$_m$OH]$_x$
(20) R′[(MO)$_n$(BuO)$_m$OH]$_x$
(21) R′[(MO)$_n$(PrO—BuO)$_m$OH]$_x$
(22) R′[(PrO—BuO)$_n$(EtO)$_m$OH]$_x$
(23) R′[(PrO—BuO)$_n$(PrO)$_m$OH]$_x$
(24) R′[(PrO—BuO)$_n$(BuO)$_m$OH]$_x$
(25) R′[(PrO—BuO)$_n$(MO)$_m$OH]$_x$

*Step III*

The products of Step II can be reacted with one of the five epoxides or mixture of oxides which had not been reacted in the immediately preceding step, i.e. either EtO, PrO, BuO, MO, or PrO—BuO, with the above exclusion as to the epoxide just reacted. This will be illustrated as follows:

(26) R′[(EtO)$_n$(PrO)$_m$(EtO)$_x$OH]$_x$
(27) R′[(EtO)$_n$(PrO)$_m$(BuO)$_x$OH]$_x$
(28) R′[(EtO)$_n$(PrO)$_m$(MO)$_x$OH]$_x$
(29) R′[(EtO)$_n$(PrO)$_m$(PrO—BuO)$_x$OH]$_x$
(30) R′[(EtO)$_n$(BuO)$_m$(EtO)$_x$OH]$_x$
(31) R′[(EtO)$_n$(BuO)$_m$(PrO)$_x$OH]$_x$
(32) R′[(EtO)$_n$(BuO)$_m$(MO)$_x$OH]$_x$
(33) R′[(EtO)$_n$(BuO)$_m$(PrO—BuO)$_x$OH]$_x$
(34) R′[(EtO)$_n$(MO)$_m$(EtO)$_x$OH]$_x$
(35) R′[(EtO)$_n$(MO)$_m$(PrO)$_x$OH]$_x$
(36) R′[(EtO)$_n$(MO)$_m$(BuO)$_x$OH]$_x$
(37) R′[(EtO)$_n$(MO)$_m$(PrO—BuO)$_x$OH]$_x$
(38) R′[(EtO)$_n$(PrO—BuO)$_m$(EtO)$_x$OH]$_x$
(39) R′[(EtO)$_n$(PrO—BuO)$_m$(PrO)$_x$OH]$_x$
(40) R′[(EtO)$_n$(PrO—BuO)$_m$(BuO)$_x$OH]$_x$
(41) R′[(EtO)$_n$(PrO—BuO)$_m$(MO)$_x$OH]$_x$
(42) R′[(PrO)$_n$(EtO)$_m$(PrO)$_x$OH]$_x$
(43) R′[(PrO)$_n$(EtO)$_m$(BuO)$_x$OH]$_x$
(44) R′[(PrO)$_n$(EtO)$_m$(MO)$_x$OH]$_x$
(45) R′[(PrO)$_n$(EtO)$_m$(PrO—BuO)$_x$OH]$_x$
(46) R′[(PrO)$_n$(BuO)$_m$(EtO)$_x$OH]$_x$
(47) R′[(PrO)$_n$(BuO)$_m$(PrO)$_x$OH]$_x$
(48) R′[(PrO)$_n$(BuO)$_m$(MO)$_x$OH]$_x$
(49) R′[(Pro)$_n$(BuO)$_m$(PrO—BuO)$_x$OH]$_x$
(50) R′[(PrO)$_n$(MO)$_m$(EtO)$_x$OH]$_x$
(51) R′[(PrO)$_n$(MO)$_m$(PrO)$_x$OH]$_x$
(52) R′[(PrO)$_n$(MO)$_m$(BuO)$_x$OH]$_x$
(53) R′[(PrO)$_n$(MO)$_m$(PrO—BuO)$_x$OH]$_x$
(54) R′[(PrO)$_n$(PrO—BuO)$_m$(EtO)$_x$OH]$_x$
(55) R′[(PrO)$_n$(PrO—BuO)$_m$(PrO)$_x$OH]$_x$
(56) R′[(PrO)$_n$(PrO—BuO)$_m$(BuO)$_x$OH]$_x$
(57) R′[(PrO)$_n$(PrO—BuO)$_m$(MO)$_x$OH]$_x$
(58) R′[(BuO)$_n$(EtO)$_m$(PrO)$_x$OH]$_x$
(59) R′[(BuO)$_n$(EtO)$_m$(BuO)$_x$OH]$_x$

(60) R'[(BuO)$_n$(EtO)$_m$(MO)$_x$OH]$_x$
(61) R'[(BuO)$_n$(EtO)$_m$(PrO—BuO)$_x$OH]$_x$
(62) R'[(BuO)$_n$(PrO)$_m$(EtO)$_x$OH]$_x$
(63) R'[(PuO)$_n$(PrO)$_m$(BuO)$_x$OH]$_x$
(64) R'[(BuO)$_n$(PrO)$_m$(MO)$_x$OH]$_x$
(65) R'[(BuO)$_n$(PrO)$_m$(PrO—BuO)$_x$OH]$_x$
(66) R'[(BuO)$_n$(MO)$_m$(EtO)$_x$OH]$_x$
etc.

Step IV involves the oxyalkylation of the products of Step III. Step V involves the oxyalkylation of Step IV. Further oxyalkylations involve Steps VI-X or higher. This process can be continued at infinitum.

Although the hydroxy compounds described above are oxygen-containing compounds, corresponding compounds can be formed from corresponding sulfur-containing compounds. In addition, sulfur analogues of the alkylene oxides can also be employed. Thus, a thiophenol resin or a phenol resin can be oxyalkylated with alkylene oxide, alkylene sulfide, or mixtures of alkylene oxides and alkylene sulfide in a random or block-wise fashion. The following compounds are exemplary:

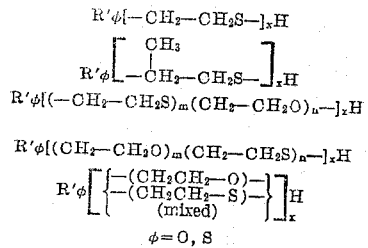

M designates H or a cation. The salts of the sulphocarboxylic acid esters which may be produced by this invention are many and varied. In general, salts of most inorganic and organic bases may be prepared. Among the inorganic salts are the alkali metal and alkaline earth salts, such as the sodium, potassium, calcium and magnesium, etc. salts as well as the salts of heavy metals. Ammonium and substituted ammonium or organic nitrogeneous base salts may also be prepared. Included within this class are, for example, the salts of alcohol amines including monoethanolamine, diethanolamine, triethanolamine, propanolamines, butanolamines, pentanolamines, glycerolamines, dimethyl monoethanolamine, diethyl monoethanolamine, dibutyl monoethanolamine, diethanol ethyl amine, cyclohexyl ethanolamine, alkylol polyamines such as alkylol derivatives of ethylene diamine, monomethyl mono-ethanolamine, diethyl monoethanolamine, 1-amino-2, 3-propanediol, 1,2-diamino-propanol; alkylamines such as butylamine, diethylamine, ethylene diamine, diethylene triamine, triethylene tetramine, monoethyl ethylene diamine, monoethyl diethylene tetramine, hydrazine and substituted hydrazines, aromatic and heterocyclic bases and cyclic nitrogenous substances such as pyridine, quinaldine, piperidine, methylpyridine, and homologues and derivatives thereof, and, in general, primary, secondary and tertiary amines substituted or not with other radicals such as hydroxy, alkyl, aryl, cycloalkyl groups and the like; quaternary ammonium bases or hydroxides such as tetramethyl ammonium hydroxide, tetraethyl ammonium hydroxide, quaternary ammonium bases with dissimilar alkyl radicals such as methyltriethyl ammonium hydroxide, propyltrimethyl ammonium hydroxide, mixtures of any two or more thereof, and the like. It will be understood that these organic nitrogenous bases may be employed in pure, impure or commercial form such as, for example, commercial triethanolamine which contains minor proportions of mono- and diethanolamine. The tabulation of specific salts given hereinabove is by no means meant to be exhaustive, but it affords to those skilled in the art more than an adequate exemplification of the practice of this invention.

In certain fields of utility other salts can also be employed. For example, calcium, barium, zinc, strontium, aluminum, chromium, nickel and other polyvalent metal salts which are soluble in hydrocarbons may be used as oil soluble detergents. They are useful, for example, in turbine oils and in lube oils of the type used in the crank cases of internal combustion engines. For this purpose they are ordinarily added to the oils in amounts of about 0.1% to about 5% by weight.

In addition to their utility as wetting agents and detergents certain salts may be employed for special purposes. For example, copper, cadmium and mercury salts may be applied as mildew-proofing agents, for example in cellulosic textiles. Amine and quaternary ammonium salts may be applied as moth proofing agents for woolens.

Although various meanings have been assigned above, the best combinations thereof will depend on the particular application to which the composition is applied. For example, R and R' can be selected so as to yield the desired oil or water solubility, or the type and amount and proportions of (OA)$_a$ can vary the solubility which has already been imparted by R and R'. In certain systems it may be desirable to employ the composition as a free sulfonic acid while in others it may be desirable to employ it is the form of its salt. Therefore, specific composition variations will depend on the particular system in which it is employed.

The compositions of this invention containing free hydroxyl groups can also be acylated with carboxylic acid.

Suitable acids include straight chain and branched chain, saturated and unsaturated, aliphatic, alicyclic, fatty, aromatic, hydroaromatic, and aralkyl acids, etc.

Examples of saturated aliphatic monocarboxylic acids are acetic, proprionic, butyric, valeric, caproic, heptanoic, caprylic, nonanoic, capric, undecanoic, lauric, tridecanoic, myristic, pentadecanoic, palmitic, heptadecanoic, stearic, nonadecanoic, eicosanoic, heneicosanoic, docosanoic, tricosanoic, tetracosanoic, pentacosanoic, cerotic, heptacosanoic, montanic, nonacosanoic, melissic and the like.

Examples of ethylenic unsaturated aliphatic acids are acrylic, methacrylic, crotonic, anglic, teglic, the pentenoic acids, the hexenoic acids, for example, hydrosorbic acid, the heptenoic acids, the octenoic acids, the nonenoic acids, the decenoic acids, for example, obtusilic acid, the undecenoic acids, the dodencenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elardic acid, the nonadecenoic acids, for example, the eicosenoic acids, the docosenoic acids, for example, erucic acid, brassidic acid, cetoleic acid, the tetradosenic acids, and the like.

Examples of dienoic acids are the pentadienoic acids, the hexadienoic acids, for example, sorbic acid, the octadienoic acids, for example, linoleic, and the like.

Examples of the trienoic acids are the octadecatrienoic acids, for example, linolenic acid, eleostearic acid, pseudo-eleocstearic acid, and the like.

Carboxylic acids containing functional groups such as hydroxy groups can be employed. Hydroxy acids, particularly the apha hydroxy acids include glycolic acid, lactic acid, the hydroxyvaleric acids, the hydroxy caproic acids, the hydroxyheptanoic acids, the hydroxy caprylic acids, the hydroxynonanoic acids, the hydroxycapric acids, the hydroxydecanoic acids, the hydroxy lauric acids, the hydroxy tridecanoic acids, the hydroxymyristic acids, the hydroxypentadecanoic acids, the hydroxypalmitic acids, the hydroxyhexadecanoic acids, the hydroxyheptadecanoic acids, the hydroxy stearic acids, the hydroxyoctadecenoic acids, for example, ricinoleic acid, ricinelardic acid, hydroxyoctadecynoic acids, for example, ricinstearolic acid, the hydroxyeicosanoic acids, for example, hydroxyarachidic acid, the hydroxydocosanoic acids, for example, hydroxybehenic acid, and the like.

Examples of acetylated hydroxyacids are ricinoleyl lactic acid, acetyl ricinoleic acid, chloroacetyl ricinoleic acid, and the like.

Examples of the cyclic aliphatic carboxylic acids are those found in petroleum called naphthenic acids, hydrocarbic and chaumoogric acids, cyclopentane carboxylic acids, cyclohexane-carboxylic acid, campholic acid, fenchlolic acids, and the like.

Examples of aromatic monocarboxylic acids are benzoic acid, substituted benzoic acids, for example, the toluic acids, the xyleneic acids, alkoxy benzoic acid, phenyl benzoic acid naphthalene carboxylic acid, and the like.

Mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated caroxby diphenyl, naphthenic, and abietic acid; Twitchell fatty acids, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids are those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids are fumaric, maleic, mesocenic, citraconic, glutonic, itaconic, muconic, aconitic acids, and the like.

Examples of aromatic polycarboxylic acids are phthalic, isophthalic acids, terephthalic acids, substituted derivatives thereof (e.g. alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups are hemimellitic, trimellitic, trimesic, mellophanic, prehnitic, pyromellitic acids, mellitic acid, and the like.

Other polycarboxylic acids are the dimeric, trimeric and polymeric acids, for example, dilinoleic, trilinoleic, and other polyacids sold by Emery Industries, and the like. Other polycarboxylic acids include those containing ether groups, for example, diglycolic acid. Mixtures of the above acids can be advantageously employed.

In addition, acid precursors such as esters, glycerides, etc. can be employed in place of the free acid.

The following examples are presented by way of illustration and not of limitation.

Example 1

Into a 1000 ml. resin pot fitted with a stirrer, Dean-Stark water trap, and reflux condenser was introduced a mixture containing 280 g. (1.0 moles) of $\alpha$-sulfolauric acid, 551.2 g. (0.5 mole) of an oxyethylated resin derived from 2a plus 5 moles of EtO, and 300 ml. of benzene. The mixture was stirred and heated at reflux temperature until the theoretical amount of water of esterification was removed (about 18 ml.). After the reaction was completed, as checked by infrared spectra, the benzene was removed by heating the mixture in vacuo. The resulting ester was converted into its sodium salt.

Example 2

Into a 1000 ml. resin pot fitted with a stirrer, Dean-Stark water trap, and reflux condenser was introduced a mixture containing 308 g. (1.1 moles) of $\alpha$-sulfolauric acid, 508 g. (0.2 mole) of an oxyalkylated resin derived from 2a plus 10 moles of EtO, and 21 moles of PrO, and 300 ml. of benzene. The mixture was stirred and heated at reflux temperature until the theoretical amount of water of esterification was removed (about 19.8 ml.). After the reaction was completed, as checked by infrared spectra, the benzene was removed by heating the mixture in vacuo. The resulting ester was converted into its sodium salt.

Example 4

Into a 500 ml. resin pot fitted with a stirrer, Dean-Stark water trap, and reflux condenser was introduced a mixture containing 102 g. (0.3 mole) of $\alpha$-sulfopalmitic acid, 226.8 g. (0.1 mole) of the reaction product of lauric acid and an oxyethylated resin derived from 4a plus 25 moles of EtO, and 150 ml. of benzene (ratio lauric acid:resin 2.5:1). The mixture was stirred and heated at reflux temperature until the theoretical amount of water of esterification was removed (about 5.4 ml.). After the reaction was completed, as checked by infrared spectra, the benzene was removed by heating the mixture in vauco. The resulting ester was converted into its ammonium salt.

Example 9

Into a 500 ml. resin pot fitted with a stirrer, Dean-Stark water trap, and reflux condenser was introduced a mixture containing 38.6 g. (0.1 mole) of $\alpha,\alpha'$-disulfododecanedioic acid, 354.4 g. (0.2 mole) of an oxyalkylated resin based on 28a plus 16M of EtO, and 8M of PrO, and 150 ml. of benzene. The mixture was stirred and heated at reflux temperature until the theoretical amount of water of esterification was removed (about 3.6 ml.). After the reaction was completed, as checked by infrared spectra, the benzene was removed by heating the mixture in vacuo. The resulting ester was neutralized with morpholine.

Additional examples presented in Table III are similarly prepared. Therefore, to save repetitive details they are presented in table form. The salts are prepared in the conventional manner, with some heating if necessary, by mixing the corresponding acid and desired base.

Where more than one alkylene oxide is added to the resin, the order of addition corresponds to the order written in the table. For example in Example 2 (EtO 10, PrO 21), means that first 10 moles of EtO are added to the resin followed by the addition of 21 moles of PrO.

The notation as to salts indicate the free acid form as well as the specific salt prepared. Thus, in Example 1 (H) Na$^\oplus$ indicates that the free acid was first prepared followed by the formation of the sodium salt.

The water removed indicated by $[-\beta H_2O]$ refers to water removed through esterification of sulfo acid as well as the carboxylic acid, if employed.

TABLE III $$\left[R_2\begin{smallmatrix}(A) & H & O \\ & R-C-COH \\ & SO_3M \\ (B) & O & H & H & O \\ & HOC-C-R-C-COH \\ & SO_3M & SO_3M\end{smallmatrix}\right]_\alpha \left[R'[(OA)_xOH]_3]L^\oplus \left(\begin{smallmatrix}O \\ C-OH\end{smallmatrix}\right)\right]_\gamma [-\beta H_2O]$$

| Ex. | Letter | $R_2$ | M | $\alpha$ | Resin Base Resin | Resin OA | Moles OA Added | Acid Name | $\gamma$ | $H_2O$ Removed $\beta$ | Salt |
|---|---|---|---|---|---|---|---|---|---|---|---|
| 1 | A | $C_{10}H_{21}-$ | H | 2 | 2a | EtO | 5 | | | 2 | (H)Na$^\oplus$ |
| 2 | A | $C_{10}H_{21}-$ | H | 5.5 | 2a | {EtO / PrO} | 10 / 21 | | | 5.5 | (H)Na$^\oplus$ |
| 3 | A | $C_{10}H_{21}-$ | H | 2 | 2a | PrO | 30 | $CH_3\overset{O}{C}OH$ | 3.5 | 5.5 | (H)K$^\oplus$ |
| 4 | A | $C_{14}H_{29}-$ | H | 3 | 4a | EtO | 25 | $C_{11}H_{23}\overset{O}{C}OH$ | 2.5 | 5.5 | (H)NH$_4^\oplus$ |
| 5 | A | $C_{14}H_{29}-$ | H | 2 | 9a | Octylene O | 5 | $C_2H_5\overset{O}{C}OH$ | 3.5 | 5.5 | (H)H$_2$N$^\oplus$(CH$_2$CH$_2$N)$_2$H |
| 6 | A | $C_{14}H_{29}-$ | H | 3 | 10a | {EtO / BuO} | 55 / 18 | $HO\overset{O}{C}CH_2O-CH_2-COH$ | 2.5 | 6.5 | (H)N⌬N—CH$_2$CH$_2$NH$_3$ / $C_{11}H_{23}$ |
| 7 | A | $C_{16}H_{33}-$ | H | 3 | 22a | {EtO / PrO} | 32 / 10 | $C_3H_7\overset{O}{C}OH$ | 3.2 | 6.2 | (H)NH$_4^\oplus$ |
| 8 | A | $C_{10}H_{21}-$ | H | 3 | 12a | EtO | 3.5 | $HO\overset{O}{C}$—⌬—$\overset{O}{C}OH$ | 2.5 | 6.5 | (H)Ba |
| 9 | B | $-C_8H_{12}$ | H | 1 | 28a | {EtO / PrO} | 16 / 8 | | | 2 | (II) Morpholinium |
| 10 | B | $-C_4H_8$ | H | 1 | 32a | {EtO / BuO} | 25 / 4 | $\overset{O}{C}OH$—⌬ | 3 | 4 | (H)C$_{12}H_{25}$—N$^\oplus$—(CH$_3$)$_3$ |
| 11 | A | $C_{10}H_{21}-$ | H | 2 | 1a | $-CH_2\overset{CH_3}{\underset{CH_3}{C}}-CH_2-O$ | 3 | | | 2 | (H)CH$_3$—C—CH$_2$—C—NH$_3^\oplus$ (CH$_3$ groups) |
| 12 | A | $C_{16}H_{33}-$ | H | 2 | 2a | $-CH-CH_2-O$ / ⌬ | 5 | | | 2 | (H)K$^\oplus$ |

The ratios of sulfo acid to carboxylic acid to oxyalkylated phenol can vary widely, depending on the particular components employed and the properties desired, for example from 0.1/0/1 to 5/5/1 such as from 0.5/0.5/1 to 3/1/1 but preferably from 1/0/1 to 3/3/1. Other ratios can also be employed.

Uses

The products obtained by this process are valuable anionic surface active agents and have many varied commercial uses. The most conspicuous property of these products is their great activity at surfaces and interfaces which promotes their use in a large field of the technical arts. For instance, they can be used as wetting, frothing, or washing agents in the treating and processing of textiles; for converting liquid or solid substances which per se are insoluble in water (such as hydrocarbons, higher alcohols, oils, fats, waxes, and resins) into creamy emulsions, clear solutions or fine stable dispersions; for dyeing; for the pasting of dyestuffs; for fulling, sizing, impregnating and bleaching treatments; as cleansing agents in hard water; in tanning and mordanting processes; for dyeing acetate with insoluble dyestuffs; for the preparation of dyestuffs in finely divided form; for dispersible dye powders; for producing foam for fire extinguishers; as a means for improving the absorptive power of fibrous bodies; and as an aid in softening hides and skins.

In addition, these products are valuable emulsifiers for insecticidal compositions and agricultural sprays such as DDT, 2,4–D, toxaphene, chlordane, dormant or mineral oil sprays, nicotine sulfate, methoxychlor, etc. and are effective dispersants for pesticidal powders, such as those containing the above toxicants. They are valuble emulsifiers for herbicides, etc.

These products are also valuable for use as additives to petroleum products, such as fuel oils, lubricating oils, greases, and as additives to the water or brine used for oil recovery from oil-bearing strata by flooding techniques.

Other valuable uses are in metal cleaning compositions; dry cleaning compositions; additives for rubber latices; foam inhibitors for synthetic rubber latex emulsions; froth flotation agents; additives for road building materials; as air entraining agents for concrete or cement, additives to asphalt compositions; plasticizers and modifiers for vinyl plastics, alkyd resins, phenol-formaldehyde resins and other types of polymeric-type plastic materials; for incorporation into adhesives, paints, linoleum, for use in bonding agents used in various insulating and building materials; as refining aids in wood digesters to prepare pulp; as additives to pulp slurries in beating operations to prevent foaming and also to aid the beating operation in paper-making; and as aids in the preparation of viscose dope.

The products are also useful as emulsifiers for emulsion polymerization, as mercerizing assistants, wetting agents, rewetting agents, dispersing agents, detergents, penetrating agents, softening agents, lime soaps, dispersants, dishwashing agents, anti-static agents, disinfectants, insecticides, moth-proofing agents, bactericides, fungicides and biocides. They are valuble as anti-fogging agents for use on glass and other surfaces where the accumulation of an aqueous fog is detrimental. They are useful in the rayon industry as additives to the dope or to the spinning bath and as aids in clarifying viscose rayon. They are of value in hydraulic fluids to improve viscosity characteristics.

The products are especially useful alone or in combination with other demulsifiers in breaking petroleum emulsions. They may be used to break emulsions of crude petroleum and salt water as obtained from oil wells, or to prevent water-in-oil emulsions resulting from acidization of oil wells by introducing the agent into the well, or to break or prevent emulsions which would result from a water flooding process for recovering oil from oil-bearing strata. They may also be used to break emulsions encountered in a petroleum refining process.

They are useful as corrosion inhibitors, as rust inhibitors, in the protection of metals especially ferrous metals, in acid pickling baths, in acid cleaning compositions, and in electroplating baths. Other valuable uses are as solvents or in solvent compositions, as cleaning agents for paint brushes, as additives for paints, lacquers, and varnishes; as lubricants, as greases and stuffing agents.

The products may be employed in the preparation of skin creams, lotions, salves and other cosmetic preparations such as home hair-wave sets, shaving creams, shampoos, toothpastes, etc. They may also be employed in food products, as foaming agents, emulsifying agents, and softening agents.

They may be used as aids in conditioning of soil; as aids in the grinding, milling or cutting of metals either in aqueous solution, emulsions or in oils; as aids in the fixing of dyes to leather and natural or synthetic fibers; as aids in level dyeing of fibers; as aids in stimulating plant growth; as an additive to cement to improve the strength of the resulting concrete or to improve its hardening time or its resistance to freezing and thawing or scaling; and as curing aids and penetrants for use in fertilizer.

Having thus described our invention what we claim as new and desire to obtain by Letters Patent is:

1. An ester formed by reacting
   (I) an α-sulfocarboxylic acid selected from the group consisting of (1) 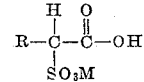

wherein R is an alkyl group having 6–50 carbon atoms and M is hydrogen or a cation, and (2) 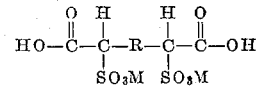

wherein R is an alkylene group having 1–50 carbon atoms, and M is hydrogen or a cation, with the reaction product of (II) an oxyalkylated polyphenolic compound and
   (III) an organic carboxylic acid selected from the group consisting of
      (1) an organic monocarboxylic acid,
      (2) an organic dicarboxylic acid, and
      (3) an organic tricarboxylic acid, the ratio of the number of moles of (I) to the number of moles of (II) to the number of moles of (III) varying from 0.1:1:0 to 5.5:1:5.

2. The ester of claim 1 wherein (I) is

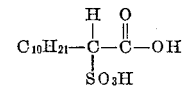

and (II) is an oxyethylated resin formed by reacting 1 mole of

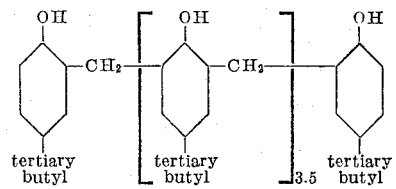

with 5 moles of ethylene oxide, the ratio of the number of moles of (I) to the number of moles of (II) to the number of moles of (III) being 2:1:0.

3. The sodium salt of the ester of claim 2.
4. The ester of claim 1 wherein (I) is

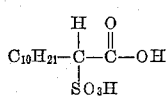

and (II) is an oxyalkylated resin formed by reacting 1 mole of

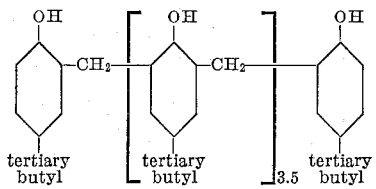

with 10 moles of ethylene oxide and then 21 moles of propylene oxide, the ratio of the number of moles of (I) to the number of moles of (II) to the number of moles of (III) being 5.5:1:0.

5. The sodium salt of the ester of claim 4.
6. The ester of claim 1 wherein (I) is

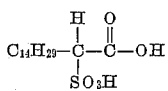

and (II) is an oxyalkylated resin formed by reacting 1 mole of

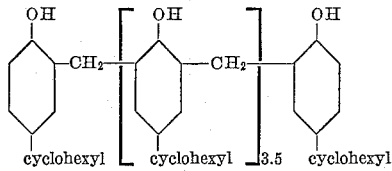

with 25 moles of ethylene oxide and (III) is lauric acid, the ratio of the number of moles of (I) to the number of moles of (II) to the number of moles of (III) being 3:1:2.5.

7. The ammonium salt of the ester of claim 6.
8. The ester of claim 1 wherein (I) is

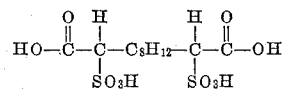

and (II) is an oxyalkylated resin formed by reacting 1 mole of

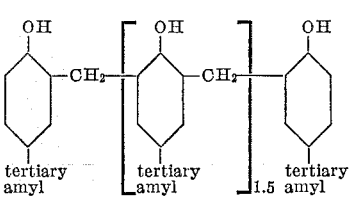

with 16 moles of ethylene oxide and then 8 moles of propylene oxide, the ratio of the number of moles of (I) to the number of moles of (II) to the number of moles of (III) being .5:1:0.

9. The morpholinium salt of the ester of claim 8.

References Cited by the Examiner
UNITED STATES PATENTS

| | | | |
|---|---|---|---|
| 2,176,423 | 10/1939 | Jaeger | 260—481 |
| 2,499,370 | 3/1950 | De Groote et al. | 260—51 |
| 2,549,437 | 4/1951 | De Groote | 260—481 |
| 2,679,526 | 5/1954 | De Groote | 260—481 |
| 2,826,562 | 3/1958 | Shokal | 260—58 |
| 3,108,087 | 10/1963 | Kirkpatrick | 260—49 |
| 3,137,713 | 6/1964 | Shen et al. | 260—470 |

WILLIAM H. SHORT, *Primary Examiner.*

C. A. WENDEL, J. C. MARTIN, M. GOLDSTEIN,
*Assistant Examiners.*